United States Patent [19]

Hadano

[11] Patent Number: 5,717,264
[45] Date of Patent: Feb. 10, 1998

[54] CONCENTRIC-DOUBLE-SHAFT SIMULTANEOUSLY ROTATING APPARATUS

[75] Inventor: Kazuhisa Hadano, Toyohashi, Japan

[73] Assignee: Shinko Electric Co., Ltd., Tokyo, Japan

[21] Appl. No.: 805,311

[22] Filed: Feb. 25, 1997

[30] Foreign Application Priority Data

Feb. 28, 1996 [JP] Japan ............... 8-069295

[51] Int. Cl.$^6$ ............... H02K 49/00
[52] U.S. Cl. ............... 310/75 D; 310/75 D; 310/96; 310/103; 310/105; 310/112; 464/29; 464/182; 416/68; 416/69
[58] Field of Search ............... 310/75 D, 103, 310/112, 105, 96; 464/29, 30, 179, 182, 183; 415/65, 68, 69; 416/124, 151, 162; 440/81; 361/242, 243, 238

[56] References Cited

U.S. PATENT DOCUMENTS 4,197,474 4/1980 Honigsbaum ............... 310/104
4,841,185 6/1989 Weldon ............... 310/115

FOREIGN PATENT DOCUMENTS 0 150 884 A 8/1985 European Pat. Off. ............... 310/83
43 43 933 A 7/1994 Germany ............... 310/112

*Primary Examiner*—Thomas M. Dougherty
*Assistant Examiner*—Karl I. E. Tamai
*Attorney, Agent, or Firm*—Bacon & Thomas

[57] ABSTRACT

A concentric-double-shaft simultaneously rotating apparatus in which a part of the force for driving an inner shaft to rotate is obtained by a device other than a rotation controlled motor to thereby reduce the capacity of the rotation controlled motor to attain reduction in size of the apparatus, increase of stiffness, and so on. The concentric-double-shaft simultaneously rotating apparatus includes at least one permanent magnet which is attached onto an inner circumferential surface of an outer shaft, and a secondary conductor such as a copper pipe, or the like, is provided on an outer circumferential surface of the inner shaft to create an induced current flow.

15 Claims, 4 Drawing Sheets

CONCENTRIC-DOUBLE-SHAFT SIMULTANEOUSLY ROTATING APPARATUS

BACKGROUND OF THE INVENTION

1. Field of the Invention

This invention relates to a concentric-double-shaft simultaneously rotating apparatus for use in spinning machinery, or the like, and particularly to a concentric-double-shaft simultaneously rotating apparatus in which an inner shaft is inserted into an outer shaft so as to be supported in the inside of the outer shaft so that the difference in rotational speed between the two shafts is controlled as a set rotational speed by a rotational speed control motor driving the inner shaft.

2. Background

Referring to FIG. 4, first, a conventional concentric-double-shaft simultaneously rotating apparatus used in spinning machinery will be described. An inner shaft S'i is inserted into a cylindrical outer shaft So and supported in the inside of the cylindrical outer shaft So through a pair of shaft bearings 1a and 1b disposed in both end portions of the outer shaft So. The outer shaft So is driven to rotate by a belt 3 partially wound on an outer circumferential surface of the outer shaft So in a state in which the outer shaft So is supported horizontally by a pair of support rollers 2. On the other hand, one end portion of the inner shaft S'i projects far from an end portion (a portion of the shaft bearing 1a) of the outer shaft So, so that the projecting end portion of the inner shaft S'i is coaxially attached to a permanent magnet 4' in a rotor of a permanent magnet type synchronized motor (rotation controlled motor) M'. A stator 6' is provided in the inside of a casing 5' of the synchronized motor M'. Further, spinning heads 7 and 8 are integrally attached to front end portions of the outer and inner shafts So and S'i, respectively. In FIG. 4, the reference numeral 9 designates a thrust ball provided at an end of a projecting portion 11a of a base plate 11 which fixes the casing 5' of the motor M'. The thrust ball 9 bears a thrust load of the inner shaft S'i.

Accordingly, the outer shaft So is driven to rotate by the belt 3 and the inner shaft S'i is driven to rotate by the synchronized motor M'. The rotations of the outer and inner shafts So and S'i are detected by first and second sensors 12 and 13, respectively. If the number of rotation of the outer shaft So changes in accordance with the load, or the like, the rotations of the outer and inner shafts So and S'i are controlled so that the number of rotation of the inner shaft S'i is changed by the synchronized motor M' to make the difference in the number of rotation between the outer shaft So and inner shaft S'i to be the predetermined number of rotation.

As described above, because the conventional apparatus has a structure in which the force for driving the inner shaft S'i entirely depends on the synchronized motor M', the capacity of the synchronized motor M' may become large and, accordingly, the size of the apparatus may become large as a whole. Further, since the size of the synchronized motor M' becomes large, the projecting length (L') of the inner shaft S'i from the shaft end (the portion of the shaft bearing 1a) of the outer shaft So becomes large. Accordingly, the stiffness for supporting the inner shaft S'i is lowered, so that vibration, or the like, occurs easily.

SUMMARY OF THE INVENTION

It is an object of the present invention to provide a concentric-double-shaft simultaneously rotating apparatus in which a part of the force for driving the inner shaft of the concentric-double-shaft simultaneously rotating apparatus configured as described above is obtained from another part to reduce the capacity of the rotation controlled motor to thereby attain reduction in size of the apparatus, increase of stiffness, and so on, and further shortening of the time required for starting and stopping the apparatus in order to improve the yield of spinning work.

In order to achieve the above object, according to the present invention, a concentric-double-shaft simultaneously rotating apparatus includes at least one permanent magnet attached onto an inner circumferential surface of an outer shaft, and a secondary conductor for making an induced current flow therein, which is provided on an outer circumferential surface of an inner shaft.

A rotating magnetic field is generated by the rotation of the outer shaft having a permanent magnet attached onto the inner circumferential surface of the outer shaft, so that an induced current flows in the secondary conductor provided on the inner shaft. Therefore, an induced rotational force acts on the inner shaft based on the induced current so that the induced rotational force serves as a part of the rotation driving force required for rotating the inner shaft. Accordingly, the capacity of the rotation controlled motor having its rotor to which the inner shaft is coaxially attached can be reduced, so that the size of the concentric-double-shaft simultaneously rotating apparatus can be reduced. Furthermore, however the shaft bearings do not rotate at the rotational speed of the outer shaft, the shaft bearings are rotated by the difference in the number of rotation between the outer shaft and the inner shaft. Therefore, if the rotation controlled motor is not controlled, an excessive load to the shaft bearings at the time of the starting/stopping of the apparatus is avoided to thereby prevent the shaft bearings from being damaged. Accordingly, the response of acceleration/deceleration of the inner shaft becomes good, and therefore the efficiency of spinning work can be improved.

DETAILED DESCRIPTION OF THE PREFERRED EMBODIMENT

The present invention will be described more in detail by reference to an embodiment thereof. In this embodiment, the parts, which are the same as the conventional concentric-double-shaft simultaneously rotating apparatus, are referenced correspondingly and the characteristic portion of the present invention will be described below while avoiding the duplication of description.

Figure 1:
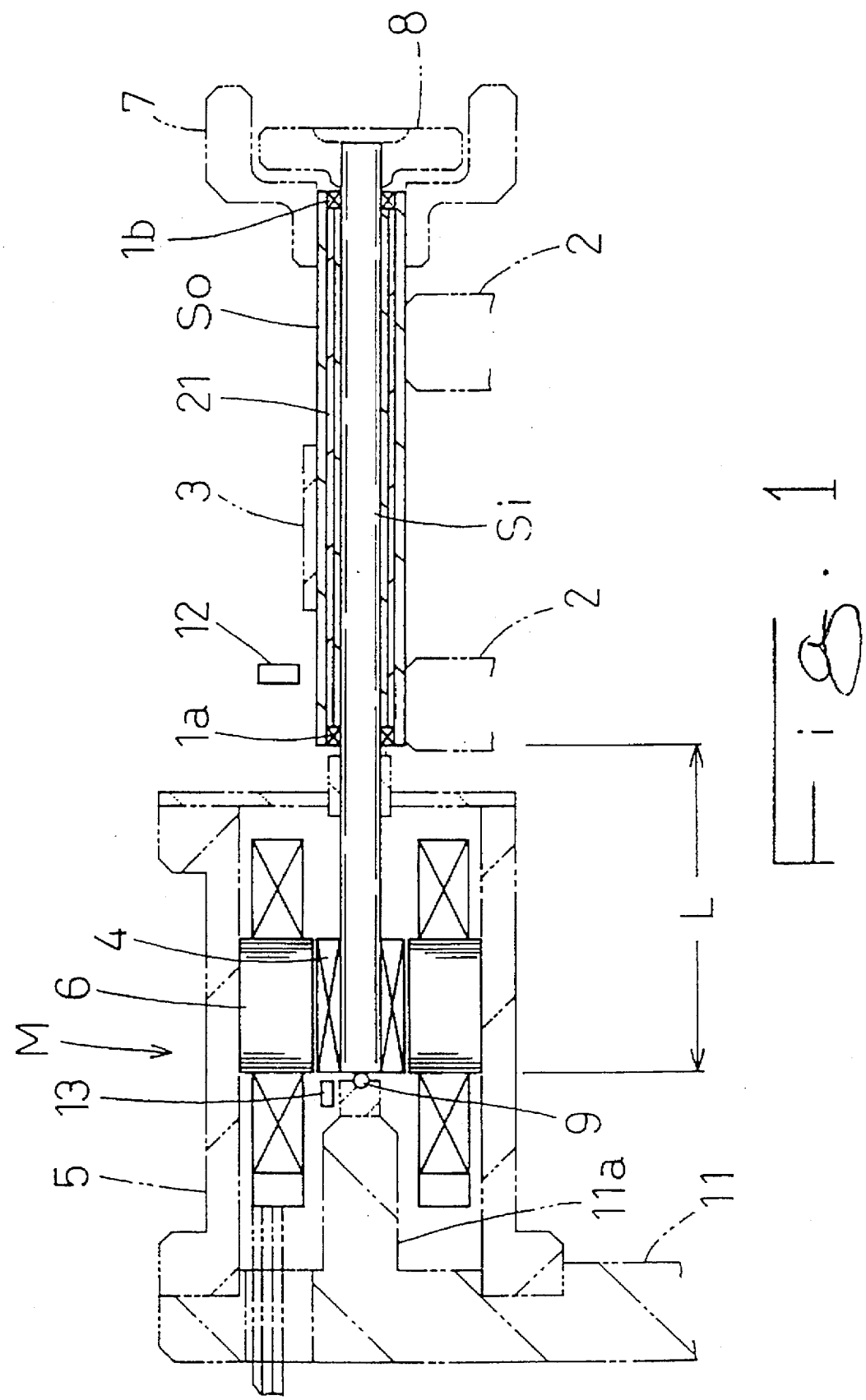
FIG. 1 shows a vertical section of a concentric-double-shaft simultaneously rotating apparatus according to the present invention.
Figure 2:
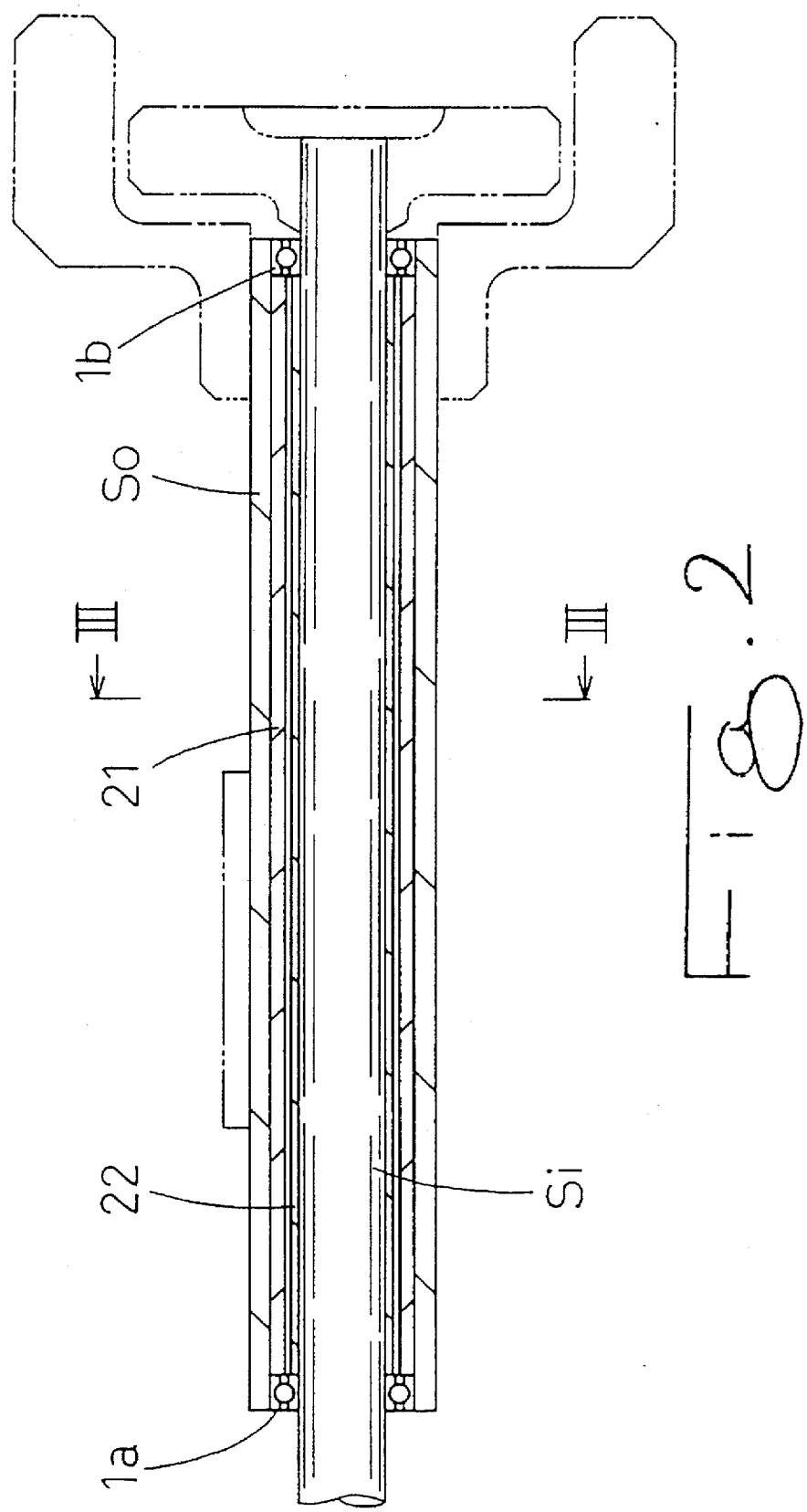
FIG. 2 shows an enlarged vertical section of main parts (portions of outer and inner shafts So and Si) in FIG. 1.
Figure 3:
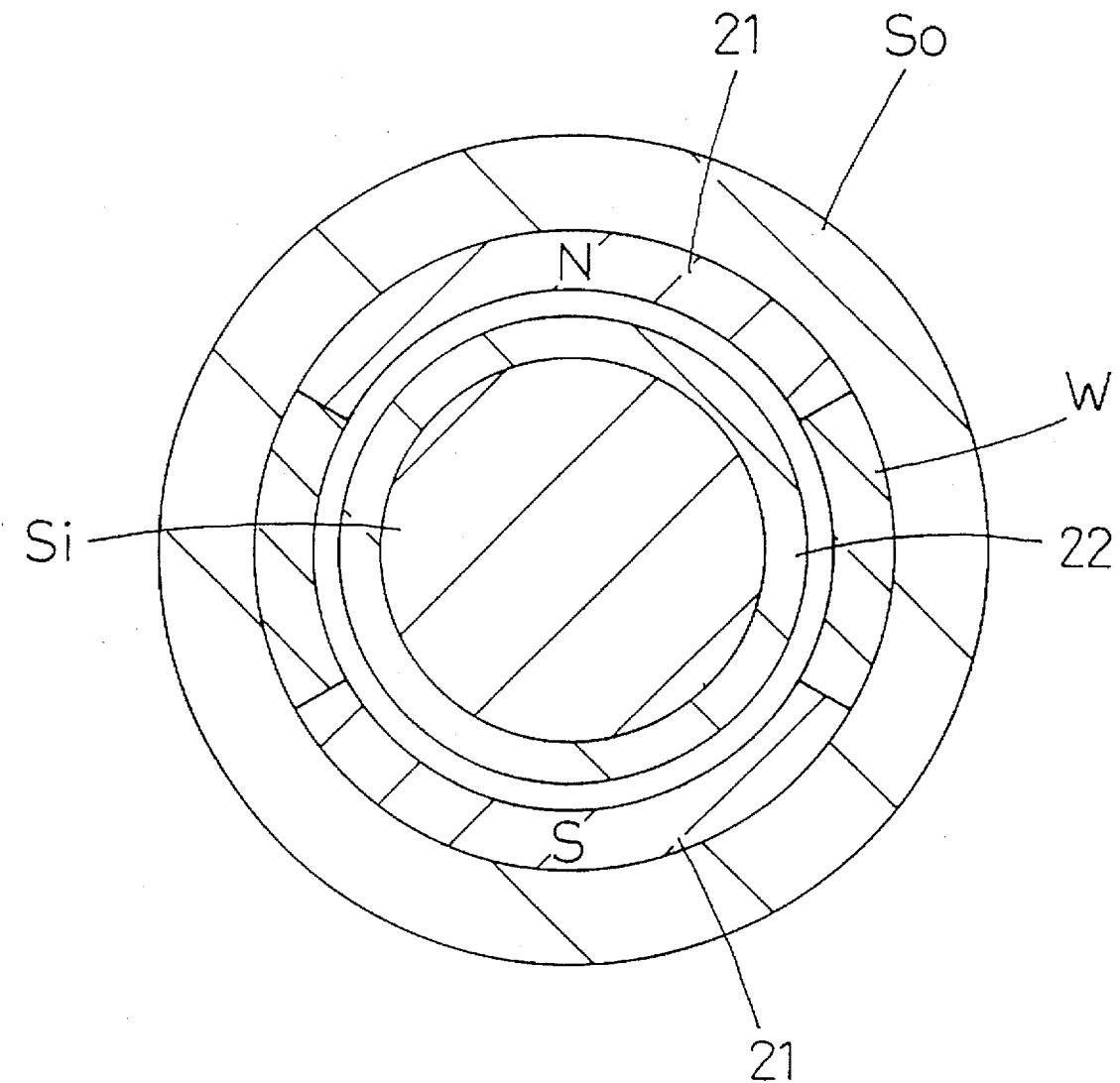
FIG. 3 shows an enlarged sectional view taken along the line III—III in FIG. 2.
Figure 4:
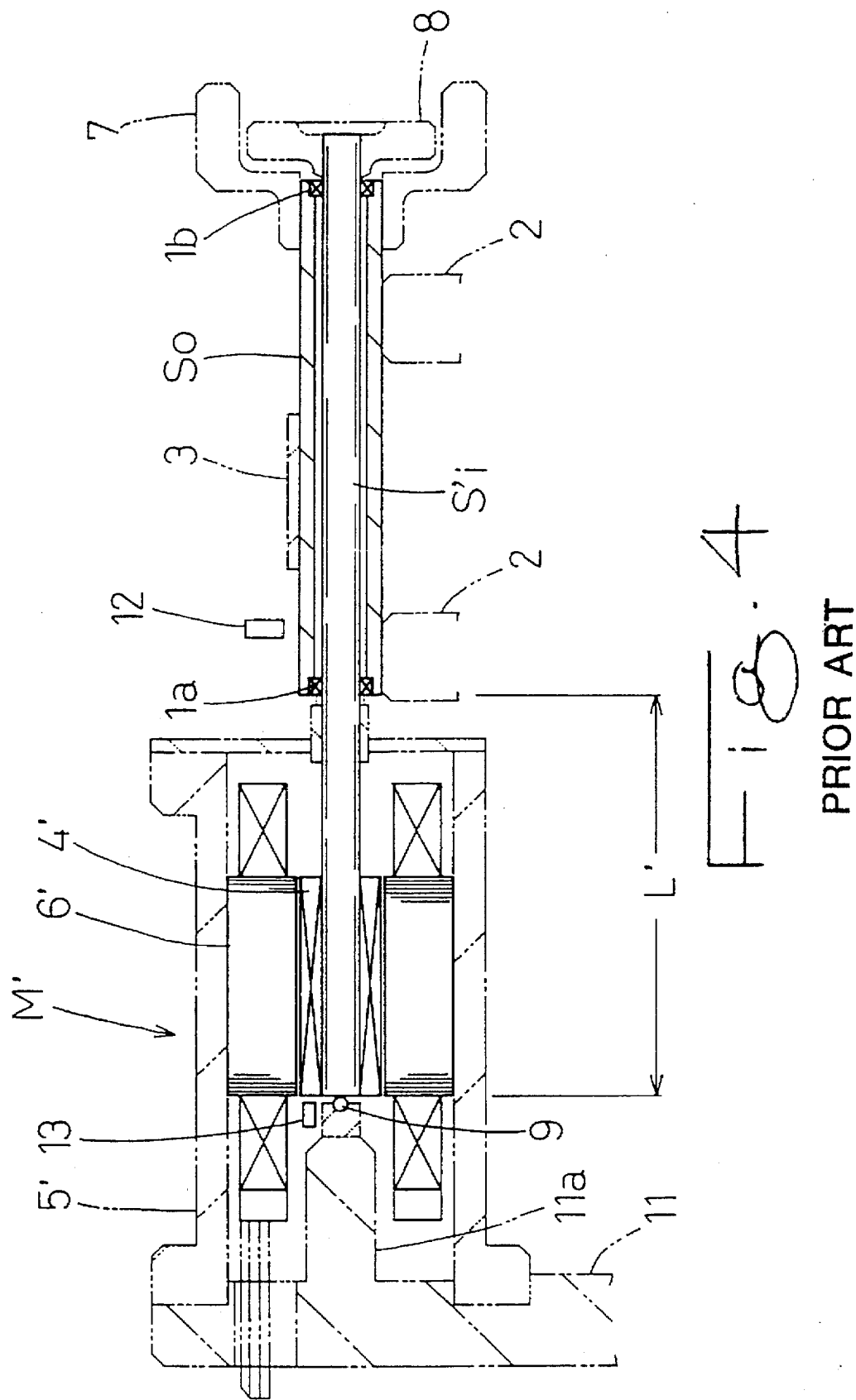
FIG. 4 shows a vertical section of a conventional concentric-double-shaft simultaneously rotating apparatus.

FIG. 1 shows a vertical section of a concentric-double-shaft simultaneously rotating apparatus according to the present invention. FIG. 2 shows an enlarged vertical section of main parts (portions of outer and inner shafts So and Si) in FIG. 1. FIG. 3 shows an enlarged sectional view taken along the line III—III in FIG. 2.

A pair of permanent magnets 21 of a two-pole structure, each has a cross section shaped in a circular arc, as shown in FIG. 3. The permanent magnets 21 are attached integrally onto the inner circumferential surface of the outer shaft So substantially over the whole length of the outer shaft So. Two spaces between the permanent magnets 21 are filled with spacers W to thereby make the permanent magnets 21 and spacers W annular as a whole. On the other hand, an outer circumferential surface of an inner pipe Si is covered with a copper pipe 22 for making an induced current flow therein as a secondary conductor. Further, a structure of a permanent magnet type synchronized motor M is substantially similar to the structure of the synchronized motor M' in the conventional apparatus, however the synchronized motor M has a smaller capacity than the synchronizing motor M' in the conventional apparatus. The projecting length (L) of the inner shaft Si from a shaft bearing 1a is shorter than the projecting length (L') of the inner shaft S'i in the conventional apparatus in accordance with the reduction of the capacity of the synchronized motor.

In the concentric-double-shaft simultaneously rotating apparatus according to the present invention, a rotating magnetic field is generated by the rotation of the outer shaft So including the permanent magnets 21 attached onto the inner circumferential surface of the outer shaft So, so that an induced current-flows in the copper pipe 22 which is a secondary conductor provided on the outer circumferential surface of the inner shaft Si. An induced rotational force due to the induced current acts on the inner shaft Si. Since the induced rotational force serves as a part of the rotation driving force required for rotating the inner shaft Si, the permanent magnet type synchronized motor M is required to output only a differential force obtained by subtracting the induced rotational force from the rotation driving force required for rotating the inner shaft Si. As a result, the capacity of the synchronized motor M can be reduced, and the size of the synchronized motor M can be reduced correspondingly. Therefore, the synchronized motor M is designed to have a function of controlling the number of rotation of the inner shaft Si to make the difference in the number of rotation between the outer shaft So and inner rotation shaft Si to the predetermined number of rotation, and a function of supplying only a deficiency of the rotation driving force required for rotating the inner shaft Si. That is, the synchronized motor M serves as an auxiliary motor in view of supply of the rotation driving force.

Further, since the size of the synchronized motor M is reduced, the aforementioned projecting length (L) of the inner shaft Si is reduced, and further the weight of the permanent magnet 4 attached, like a cantilever, onto a free end portion of the inner shaft Si is reduced so that the stiffness for supporting the inner shaft Si is increased. In addition, since the stiffness for supporting the inner shaft Si is increased, occurrence of vibration and noise is reduced at the time of the rotation of the inner shaft Si. Furthermore, in the present invention, the permanent magnets 21 per se serve as a subject to be detected by the first sensor 12 because the permanent magnets 21 are attached on the inner circumferential surface of the outer shaft So. Accordingly, there arises an advantage that any subject detected other than the permanent magnets 21 are not required to be provided on the outer shaft So.

Although the aforementioned embodiment has shown the case where a copper pipe 22 is used as the secondary conductor provided on the outer circumferential surface of the inner shaft Si to make an induced current flow therein, the present invention may be applied to the case where copper material in place of copper pipe 22 is provided on the outer circumferential surface of the inner shaft Si by welding, spraying, plating, etc. or to the case where aluminum is used in replace of copper. In short, any structure may be used so long as the outer circumferential surface of the inner shaft Si can have a structure in which the induced current flows easily. Although the aforementioned embodiment has shown the case where the permanent magnets 21 attached on the inner circumferential surface of the outer shaft So is a two-pole structure, it is a matter of course that the number of poles is not limited thereto and that the invention may be applied to a ring-shaped magnet. In addition, the synchronized motor M may be replaced by an induction motor which is controllable the number of rotation.

According to the present invention, in a concentric-double-shaft simultaneously rotating apparatus configured as described above, a plurality of permanent magnets are (or a ring-shaped magnet is) attached onto the inner circumferential surface of an outer shaft and a secondary conductor is provided on the outer circumferential surface of an inner shaft to make an induced current flow therein so that an induced rotational force acts on the inner shaft. Accordingly, the capacity of a rotation controlled motor for driving the inner shaft to rotate can be reduced, so that the size of the double-shaft simultaneously rotating apparatus can be reduced.

Accordingly, the response of acceleration/deceleration of the inner shaft is made good, so that improvement in efficiency of spinning work is attained. Furthermore, since the size of the rotation controlled motor can be reduced, the stiffness for supporting the inner shaft can be increased.

What is claimed is:

1. A concentric-double-shaft simultaneously rotating apparatus, comprising:

an outer shaft driven to rotate by a belt wound on an outer circumferential surface of said outer shaft, said outer shaft having a hollow cylindrical shape;

rotation controlling means for controlling a rotation controlled motor;

an inner shaft including a first end portion coaxially attached to a rotor of said rotation controlled motor and a second end portion inserted into said outer shaft so that said inner shaft is concentrically supported in said outer shaft, wherein the number of rotations of said inner shaft is controlled by said rotation controlled motor so that a difference between the number of rotations of said inner shaft and the number of rotations of said outer shaft corresponds to a predetermined number of rotations;

a permanent magnet member attached on an inner circumferential surface of said outer shaft; and a secondary conductor provided on an outer circumferential surface of said inner shaft.

2. The apparatus of claim 1, wherein said inner shaft obtains an induced rotational force by flowing an induced current in said secondary conductor due to the difference between the number of rotation of said inner shaft and the number of rotation of said outer shaft.

3. The apparatus of claim 1, wherein when said outer shaft is rotated, an induced rotational force is generated in said inner shaft due to an induced current flowing in said secondary conductor.

4. The apparatus of claim 1, wherein said rotation controlling means includes rotation detecting means for detecting each rotation of said inner shaft and said outer shaft.

5. The apparatus of claim 4, wherein said rotation detecting means is provided above said outer shaft.

6. The apparatus of claim 1, wherein said permanent magnet member includes a plurality of permanent magnets and a plurality of spacers, said permanent magnets and spacers being arranged alternately.

7. The apparatus of claim 6, wherein said permanent magnets and spacers are arranged to make an annular shape as a whole of said magnetic member.

8. The apparatus of claim 1, wherein said permanent magnetic member includes a permanent magnet having a continuous ring shape.

9. The apparatus of claim 1, wherein said permanent magnet member is attached along said inner circumferential surface of said outer shaft.

10. The apparatus of claim 1, wherein said rotation controlled motor is fixed on a base plate, and said outer shaft is supported horizontally by a roller.

11. The apparatus of claim 1, wherein said inner shaft is supported in said outer shaft by shaft bearings disposed in both end portions of said outer shaft.

12. The apparatus of claim 1, further comprising an outer spinning head and an inner spinning head, said heads, attached integrally to an end portion of said outer shaft and said second end portion of said inner shaft, respectively.

13. The apparatus of claim 1, wherein said secondary conductor includes a copper pipe.

14. The apparatus of claim 1, wherein said secondary conductor is integrally formed on said outer circumferential surface of said inner shaft.

15. The apparatus of claim 1, wherein said outer shaft and said inner shaft are arranged to form an electric generator.

* * * * *